US008018462B2

(12) United States Patent  
Bhogal et al.

(10) Patent No.: US 8,018,462 B2  
(45) Date of Patent: Sep. 13, 2011

(54) PACK AVATAR FOR SHARED INVENTORY IN A VIRTUAL UNIVERSE

(75) Inventors: Kulvir S. Bhogal, Fort Worth, TX (US); Rick Allen Hamilton, II, Charlottesville, VA (US); Clifford Alan Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 12/029,132

(22) Filed: Feb. 11, 2008

(65) Prior Publication Data

US 2009/0201299 A1   Aug. 13, 2009

(51) Int. Cl.  
*G06T 13/00* (2006.01)

(52) U.S. Cl. ...................................... 345/473
(58) Field of Classification Search .................. 345/419, 345/473

See application file for complete search history.

(56) References Cited

U.S. PATENT DOCUMENTS

| | | | |
|---|---|---|---|
| 5,615,373 A | 3/1997 | Ho | |
| 6,476,830 B1 * | 11/2002 | Farmer et al. | 715/769 |
| 6,753,857 B1 | 6/2004 | Matsuura et al. | |
| 6,941,184 B2 | 9/2005 | Ebert | |
| 7,069,228 B1 | 6/2006 | Rose et al. | |
| 7,257,552 B1 | 8/2007 | Franco | |
| 7,277,896 B2 | 10/2007 | Matsubara et al. | |
| 7,587,338 B2 | 9/2009 | Owa | |
| 7,666,095 B2 * | 2/2010 | Van Luchene | 463/29 |
| 7,713,116 B2 | 5/2010 | Keam et al. | |
| 2002/0002541 A1 | 1/2002 | Williams | |
| 2002/0029179 A1 | 3/2002 | Gruber et al. | |
| 2002/0052756 A1 | 5/2002 | Lomangino | |
| 2002/0059120 A1 | 5/2002 | Milton | |
| 2002/0107701 A1 | 8/2002 | Batty et al. | |
| 2005/0021353 A1 | 1/2005 | Aviles et al. | |

(Continued)

FOREIGN PATENT DOCUMENTS

WO        9607151 A1     3/1996

OTHER PUBLICATIONS

Kulvir S. Bhogal et al., U. S. Patent Application entitled "Maintenance of Group Shared Inventories in a Virtual Universe," filed Feb. 11, 2008, U.S. Appl. No. 12/028,918.

(Continued)

*Primary Examiner* — Ryan R Yang  
(74) *Attorney, Agent, or Firm* — Schmeiser, Olsen & Watts; Mark C. Vallone (57) ABSTRACT

Generally speaking, systems, methods and media for providing a pack avatar for sharing inventory in a virtual universe are disclosed. Embodiments of a method may include receiving a request to create a pack avatar carrying one or more shared inventory items in a virtual universe and creating a pack avatar based on the received requests. Embodiments may include rendering the pack avatar in the virtual universe. Embodiments may also include, in response to receiving a request from a virtual universe user to borrow one or more shared inventory items carried by the pack avatar, accessing the one or more requested shared inventory items and rendering the one or more requested shared inventory items in the virtual universe. Further embodiments may include associating the pack avatar with a user and moving the pack avatar within the virtual universe.

20 Claims, 5 Drawing Sheets

U.S. PATENT DOCUMENTS

| | | | |
|---|---|---|---|
| 2005/0261980 | A1 | 11/2005 | Hadi |
| 2007/0033279 | A1 | 2/2007 | Battat et al. |
| 2007/0052702 | A1 | 3/2007 | Trotta et al. |
| 2007/0075993 | A1 | 4/2007 | Nakanishi et al. |
| 2007/0118420 | A1 | 5/2007 | Jung et al. |
| 2008/0022137 | A1 | 1/2008 | Ginter et al. |
| 2008/0109910 | A1 | 5/2008 | Day et al. |
| 2008/0204448 | A1 | 8/2008 | Dawson et al. |
| 2009/0158161 | A1 | 6/2009 | Gibbs et al. |

OTHER PUBLICATIONS

Kulvir S. Bhogal et al., U. S. Patent Application entitled "Maintenance of Group Shared Inventories in a Virtual Universe," filed Feb. 15, 2008, U.S. Appl. No. 12/032,464.

Kulvir S. Bhogal et al., U. S. Patent Application entitled "Shared Inventory Item Donation in a Virtual Universe," filed Feb. 11, 2008, U.S. Appl. No. 12/029,194.

Kulvir S. Bhogal et al., U. S. Patent Application entitled "Tracking of Shared Inventory in a Virtual Universe,", filed Feb. 15, 2008, U.S. Appl. No. 12/032,488.

Ortiz Roman, Denisse Y., Non-Final Office Action: mail date Aug. 10, 2009; published by the USPTO in utility U.S. Appl. No. No. 12/028,918, pp. 17.

Champagne, Luna, Non-Final Office Action; mail date May 11, 2010; published by the USPTO in utility U.S. Appl. No. 12/032,464, pp. 18.

Fan, Shiow-JY, Non-Final Office Action; mail date May 7, 2010; published by the USPTO in utility U.S. Appl. No. 12/029,194, pp. 16.

Ortiz Roman, Denisse Y., Non-Final Office Action: mail date Apr. 16, 2010; published by the USPTO in utility U.S. Appl. No. 12/028,918, pp. 16.

Kulvir S. Bhogal et al., Amendment Accompanying RCE, mail date Feb. 23, 2010, published by Applicants in utility U.S. Appl. No. 12/028,918, pp. 13.

Ortiz Roman, Denisse Y., Final Office Action; mail date Nov. 27, 2009; published by the USPTO in utility U.S. Appl. No. 12/028,918, pp. 14.

Applicant's attorney Erik Osterrieder, Response to Non-Final Office Action of 12/028,918, Jul. 12, 2010, Austin, TX, USA.

Final Office Action of 12/028,918, Aug. 5, 2010, Alexandria, VA, USA.

Applicant's attorney Erik Osterrieder, Response to Non-Final Office Action of 12/029,194, Aug. 5, 2010, Austin, TX, USA.

Office Action (Mail Date May 10, 2011) for U.S. Appl. No. 12/032,464, Filing Date Feb. 15, 2008.

Blizzard Entertainment: World of Warcraft, "Guild Banks" (Internet Archived Content: Guild Banks found at www.worldofwarcraft.com/info/basics/guildbanks.html), Feb. 4, 2008, pp. 1-3

Office Action (Mail Date Aug. 18, 2010) for Patent Application No. 12/032,488, Filing Date Feb. 15, 2008.

Final Office Action (Mail Date May 17, 2011) for Patent Application No. 12/032,488, Filing Date Feb. 15, 2008.

* cited by examiner

FIG. 4

PACK AVATAR FOR SHARED INVENTORY IN A VIRTUAL UNIVERSE

FIELD OF INVENTION

The present invention is in the field of data processing systems and, in particular, to systems, methods and media for providing a pack avatar for sharing inventory in a virtual universe.

BACKGROUND

Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings. Computer systems are often connected to the Internet or other broad-based network in order to communicate with other computer systems, access information or other resources, or perform various tasks associated with business, personal banking, electronic commerce transactions; or other endeavors.

One application for computer systems that is increasing in importance is for use in accessing virtual universes (VUs), which are also known as virtual worlds and virtual world environments (VWEs). A VU represents a real or imaginary place using graphics, images, video, auditory data, or other sensory data to define a representation on a computer system to one or more users. The hardware and software that together create a VU provide the ability for users to interact with the VU in various ways. VUs commonly allow for multiple users to simultaneously interact with the VU, allowing the users to thus interact with each other within the VU and form a community. Current VUs such as Second Life® by Linden Lab or There® by Makena Technologies provide an interactive, three-dimensional (3D) online digital world with hundreds of thousands of users accessing the world via the Internet. In these graphical VUs, users typically are represented by an avatar within the online world, and the users may command their avatar to move within the VU, communicate with other users via their avatars, etc., and thus interact with the virtual world. VUs typically allow users (using a client program on their computer system) to use various tools to view, navigate, and modify the virtual world as well as participate in its virtual economy.

VU users typically have an inventory of items that they own, and these inventory items may be bought, sold, traded, etc. during operation of the VU. Items in a typical inventory may include clothing, virtual pets, vehicles, electronic media (e.g., music files), or other possessions. Each inventory item may represent a piece of code or other data which may be rendered in some fashion to the user during a session in the VU. Clothing inventory, for example, may be rendered as clothing for the user's avatar while a virtual dog, in another example, may render as an automated avatar that follows the user's avatar within the VU. The contents of a user's inventory are typically displayed in a hierarchical, manner similar to an operating system's display of folders, subfolders, and files within a file system.

The current use of inventories within a VU is limited. Individuals must typically manage their own inventories, manually adding or deleting inventory items from their inventory. Also, since each inventory item often has software code necessary to render it, the stored code results in significant storage and maintenance requirements within the VU as each instance of code is stored separately. The cost of purchasing or otherwise acquiring many inventory items is also sometimes prohibitive for many users. The lack of sharing may thus exacerbate the storage problems associated with inventory items as the code must be stored for each individual user. Managing inventories has thus become a major problem in VU space as such inventories are increasingly taken up by functional software, documents, and other such items that today reside on local drives. Encouraging users to purchase or borrow shared inventory may thus provide performance benefits by reducing required storage space as well as by providing revenue opportunities or other benefits for VU operators and content providers.

SUMMARY OF THE INVENTION

The problems identified above are in large part addressed by systems, methods and media for providing a pack avatar for sharing inventory in a virtual universe. A method for managing shared inventory in a virtual universe is disclosed. Embodiments of a method may include receiving a request to create a pack avatar carrying one or more shared inventory items in a virtual universe and creating a pack avatar based on the received requests. Embodiments may include rendering the pack avatar in the virtual universe. Embodiments may also include, in response to receiving a request from a virtual universe user to borrow one or more shared inventory items carried by the pack avatar, accessing the one or more requested shared inventory items and rendering the one or more requested shared inventory items in the virtual universe. Further embodiments may include associating the pack avatar with a user and moving the pack avatar within the virtual universe.

Another embodiment provides a computer program product comprising a computer-useable medium having a computer readable program wherein the computer readable program, when executed on a computer, causes the computer to perform a series of operations for providing a pack avatar for sharing inventory in a virtual universe. The series of operations generally includes receiving a request to create a pack avatar carrying one or more shared inventory items in a virtual universe and creating a pack, avatar based on the received requests. Embodiments may include rendering the pack avatar in the virtual universe. Embodiments may also include a series of operations for, in response to receiving a request from a virtual universe user to borrow one or more shared inventory items carried by the pack avatar, accessing the one or more requested shared inventory items and rendering the one or more requested shared inventory items in the virtual universe. Further embodiments may include a series of operations for associating the pack avatar with a user and moving the pack avatar within the virtual universe.

A further embodiment provides a data processing system having a machine-accessible medium storing a plurality of program modules. Embodiments may include a user interface module to receive requests from users of a virtual universe to borrow a shared inventory item carried by a pack avatar. Embodiments may also include a pack avatar operation module to create a pack avatar carrying one or more shared inventory items and to render the pack avatar in the virtual universe. Embodiments may also include a pack avatar movement module to move the created pack avatar within the virtual universe and in a pack inventory module to facilitate access of shared inventory items stored in a pack inventory database. Embodiments may also include where the pack inventory module accesses a shared inventory item requested by a user and renders the requested shared inventory item in the virtual universe.

BRIEF DESCRIPTION OF THE DRAWINGS

Aspects of certain embodiments of the invention will become apparent upon reading the following detailed description and upon reference to the accompanying drawings in which like references may indicate similar elements.

DETAILED DESCRIPTION OF EMBODIMENTS

The following is a detailed description of example embodiments of the invention depicted in the accompanying drawings. The example, embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for providing a pack avatar for sharing inventory in a virtual universe are disclosed. Embodiments of a method may include receiving a request to create a pack avatar carrying one or more shared inventory items in a virtual universe and creating a pack avatar based on the received requests. Embodiments may include rendering the pack avatar in the virtual universe. Embodiments may also include, in response to receiving a request from a virtual universe user to borrow one or more shared inventory items carried by the pack avatar, accessing the one or more requested shared inventory items and rendering the one or more requested shared inventory items in the virtual universe. Further embodiments may include associating the pack avatar with a user and moving the pack avatar within the virtual universe.

The system and methodology of the depicted embodiments provide for effective and efficient management of a pack avatar for carrying shared inventory in a virtual universe. The disclosed pack avatar may maintain shared inventory items for a group of users in a virtual universe by carrying the items and facilitating borrowing or other access of the items by users. In some embodiments, the pack avatar may be maintained in close proximity to the users so that it is easily accessible whenever they desire to borrow a shared inventory item. A user desiring to borrow a shared inventory item may approach the pack avatar and request the item using any virtual universe methodology to accomplish it. Pack avatars may also be configured to wander around an environment (such as a virtual state fair or virtual concert), thus providing large numbers of users the ability to borrow inventory items from the pack avatar. By providing for borrowing of items, the pack avatar may provide an enhanced user experience and may also provide opportunities for generating revenue for content providers, virtual universe operators, or others. The resources required to store and maintain various inventory items may also be reduced as the disclosed pack avatar system helps prevent wasteful duplicative storage of shared inventory items as the shared inventory items need not be stored in a unique instance for each user sharing the item and can instead be efficiently stored in one location. Borrowing terms and conditions may also be imposed, such as by putting time limits on usage, requiring payment of a fee, limiting how the borrowing user may utilize the item, or other restrictions.

In general, the routines executed to implement the embodiments of the invention may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but is not limited to firmware, resident-software, microcode, etc. Moreover, embodiments of the invention may also be implemented via parallel processing using a parallel computing architecture, such as one using multiple discrete systems (e.g., plurality of computers, etc.) or an internal multiprocessing architecture (e.g., a single system with parallel processing capabilities).

Aspects of embodiments of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable tangible storage medium or tangible device providing program code for use by or in connection with a computer or any instruction execution system. For the purposes of this description, a computer-usable or computer readable tangible storage medium or tangible device can be any apparatus that can contain, store, or communicate the program code for use by or in connection with the instruction execution system, apparatus, or device. The tangible storage medium or tangible device may be an electronic, magnetic, optical, electromagnetic, infrared, or semiconductor system (or apparatus or device). Examples of a computer-readable tangible storage medium or tangible device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Figure 1:
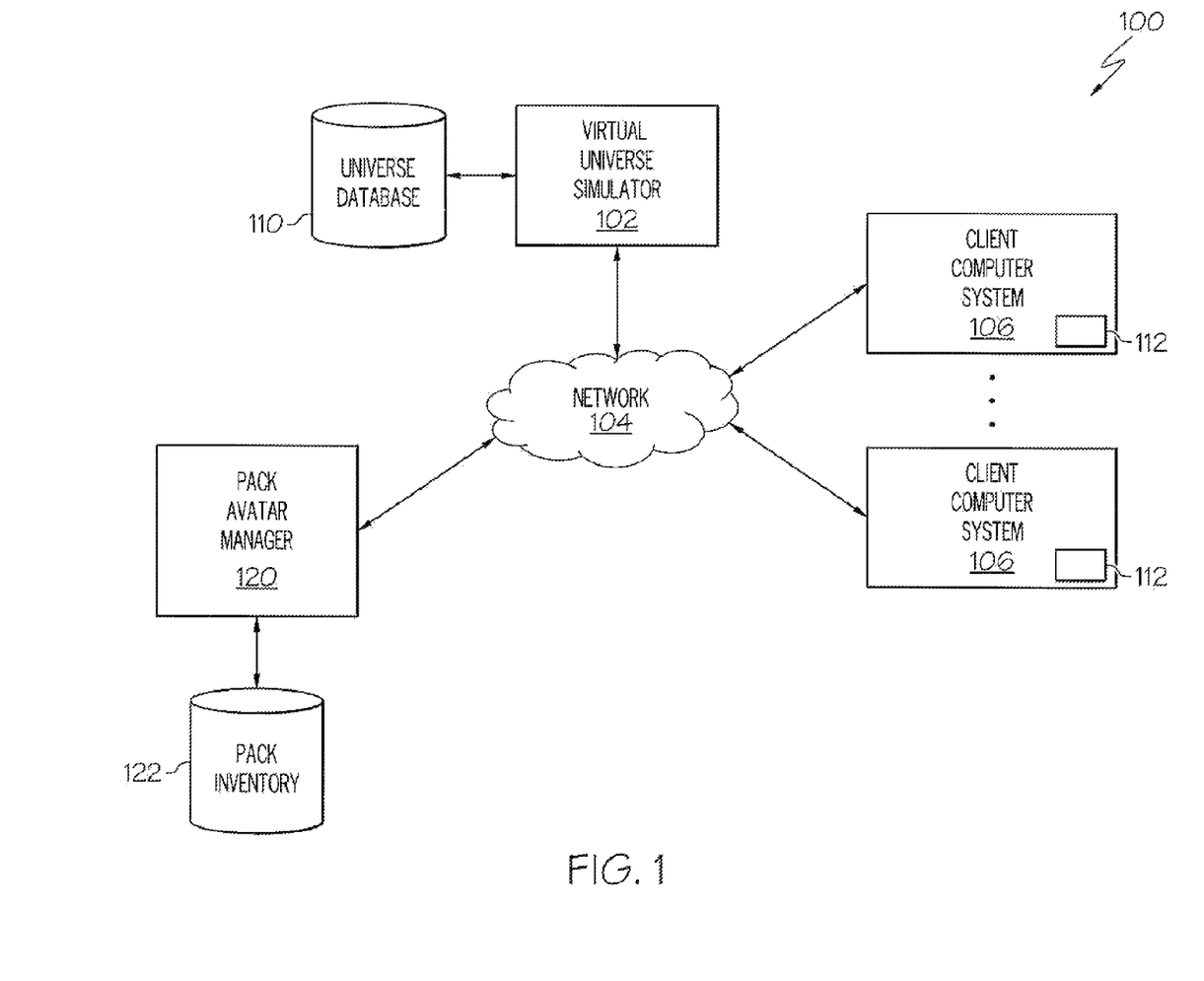
FIG. 1 depicts a virtual pack avatar system with a virtual universe simulator, one or more client computer systems, and a pack avatar manager according to some embodiments.

Turning now to the drawings, FIG. 1 depicts a virtual pack avatar system with a virtual universe (VU) simulator, one or more client computer systems, and a pack avatar manager according to some embodiments. In the depicted embodiment, the virtual pack avatar system 100 includes a virtual universe simulator 102 in communication with a plurality of client computer systems 106 via network 104. The virtual universe simulator 102 and client computer systems 106 may also be in communication with a pack avatar manager 120 via network 104. Pack inventory (i.e., shareable inventory items to be used with a pack avatar) may be stored in a variety of possible inventory sources, including a universe database 110, a pack inventory database 122, as part of a client computer system 106, or other location. As will be described in more detail subsequently, a virtual universe simulator 102 may manage a virtual universe (VU) by interacting with a variety of users of client computer systems 106 and the pack avatar manager 120 may facilitate providing a pack avatar carrying one or more shared inventory items that can be borrowed, by users of the client-computer systems 106.

Inventory items may be any item that may be associated with a user in a virtual universe. Inventory items may each be comprised of one or more files, be part of a larger database, or be stored in any other fashion. In some embodiments, an inventory item may be a piece of software code that is renderable in a virtual universe. In other embodiments, inventory items may be represented as non-executable data that may be used by the VU to render the inventory item for the user when needed. Non-limiting examples of inventory items include graphics files, sound files, animations, electronic documents, video files, avatar clothing or accessories, avatar body parts, avatar tools or vehicles or other objects, avatar gestures, automated avatars, calling cards, landmarks (such as bookmarked locations) or other geographical information, items in a lost and found folder, note cards, photos and photo albums, scripts (e.g., macros to perform actions), textures, deleted items, or any other type of item. One of ordinary skill in the art will recognize that inventory items may include executable code, non-executable data, or any other type of information, and may also represent any type of item within a VU.

One of ordinary skill in the art will recognize that carrying of a shared inventory item by an avatar may be accomplished in a wide variety of ways that encompass any means of associating an inventory item with an avatar. When a pack avatar carries an item, the item may be visually depicted or the item may simply be associated with the pack avatar. The pack avatar may have the form of an animal or human in some embodiments and, in these embodiments, a visual depiction of the shared inventory item being carried by the avatar (such as in a pack or attached to the avatar's body) may be used. In these embodiments, a user may select the avatar to receive an indication of any items associated with the pack avatar.

Virtual universe simulator 102 may be implemented on one or more servers or other computer systems (such as those described in relation to FIG. 2) adapted to implement all or part of a virtual universe. The virtual universe simulator 102 may be implemented, for example, on one or more application servers such as International Business Machine's (IBM®'s) WebSphere® Application Server (WAS) that may serve as middleware to set up, operate, and integrate e-business applications across multiple computing platforms using Web technologies. The virtual universe simulator 102 may provide a virtual universe to users by accessing stored information from a database and creating and operating the virtual universe based on the stored information. To accomplish this, the virtual universe simulator 102 may render the virtual universe, including a user's inventory items, on the client computer system 102 so that the user can view or otherwise experience the virtual universe. An example virtual universe simulator 102 may include massively multiplayer online games such as the Second Life® virtual world from Linden Lab or There® by Makena Technologies.

A virtual universe simulator 102 may also have a universe database 110 to store a variety of files used to create, maintain, and operate a virtual universe (collectively "environment information"), such as graphics files (e.g., buildings, avatars, landscapes, items, etc.), sound files (e.g., environmental sounds, spoken words, etc.), or text files (e.g., configuration information, descriptive information for objects, user information, etc.). The universe database 110 may also store shared inventory items and/or information relating to shared inventory items, such as item metadata, for use by the pack avatar manager 120. Shared inventory items, much like traditional inventory items, may be rendered within a virtual universe. The universe database 110 may be stored on any type or combination of storage devices, including volatile or non-volatile storage such as hard drives, storage area networks, memory, fixed or removable storage, or other storage devices.

Users may utilize a client computer system 106 according to the present embodiments to access the virtual universe simulator 102 (and thus the virtual universe) via network 104. Client computer system 106 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2. A user of the client computer system 106 may utilize a VU interface 112 to interact with the VU operated by the virtual world simulator 102. VU interface 112 may be dedicated client software provided by the VU operator in some embodiments or it may alternatively be existing general software such as a browser.

Network 104 may be any type of data communications channel or combination of channels, such as the Internet, an intranet, a LAN, a WAN, an Ethernet network, a wireless network, telephone network, a proprietary network, or a broadband cable network. In one example, the Internet may serve as network 104 and the client computer systems 106, the pack avatar manager 120, and the virtual universe simulator 102 may communicate via the Internet using known protocols. Those skilled in the art will recognize, however, that the invention described herein may be implemented utilizing any type or combination of data communications channel(s) without departure from the scope and spirit of the invention.

The pack avatar manager 120, as will be described in more detail in relation to FIG. 3, may provide for a pack avatar to carry shared inventory items within a VU for borrowing or other use by users of the VU. The pack avatar manager 120 may create and render an avatar that carries a plurality of shared inventory items and that moves about a virtual universe. In some embodiments, the pack avatar may move such that it stays near one or more associated users so that those users may easily access the pack avatar (and also as a reminder that it exists). When a user requests borrowing an item in the shared inventory items carried by the pack avatar, the pack avatar manager 120 may process such a request by accessing the requested inventory items and then rendering the shared inventory item in the VU for the requesting user. The pack avatar manager 120 may access the shared inventory item, from a local or remote inventory source, such as the pack inventory database 122, the universe database 110, a client computer system 106, or other location. In this fashion, the code or other data necessary to reader a shared inventory item need only be stored in one location, potentially providing for efficiencies in storage requirements.

The pack avatar manager 120 may be operated by a virtual universe simulation owner, a content owner (who uses the pack avatar to distribute content), or any other entity. The pack avatar manager 120 may be implemented as an Application Programming Interface (API) to facilitate access to and from any virtual universe simulator 102, which may be particularly useful for content providers who wish to provide pack avatars to multiple VUs. Once a pack avatar API is established, a virtual, universe simulator 102 that wishes to add pack avatar capability can ensure compatibility and operability via use of the API.

The optional pack inventory database 122 may store shared inventory items and/or information relating to shared inventory items, such as item metadata, for use by the pack avatar manager 120. The pack inventory database 122 may be stored on any type or combination of storage devices, including volatile or non-volatile storage such as hard drives, storage area networks, memory, fixed or removable storage, or other storage devices. The pack inventory database 122 may be wholly or partially a separate database from the universe database 110 or it may alternatively be integrated into the universe database 110.

The pack avatar manager 120 may use any methodology to implement sharing of inventory items. In some embodiments, a virtual inventory manager (not shown) may be implemented to manage shared inventory items by facilitating the copying of a file from an inventory source to the virtual universe simulator when the shared inventory item is requested. In these embodiments, the virtual inventory manager may either be a separate program or integrated with the pack avatar manager 120. The shared inventory hems may be represented as pointers or references to the shared inventory item that is stored at a remote inventory source. The virtual inventory manager may be considered an abstraction layer between traditional means of connecting data among servers and a virtual universe simulator-specific graphical user interface (GUI). The means of connecting data among servers may include network file system (NFS) applications, structured query language (SQL), file transfer protocol (ftp), a services-oriented architecture (SOA) request, or other methodologies. A particular shared inventory item may be stored at any inventory source within the virtual pack avatar system 100, including on a pack inventory database 122 or a universe database 110. The virtual inventory manager may thus access the particular shared inventory item from its original location and provide it to a pack avatar manager 120 and/or virtual universe simulator 102 so that a user may borrow the shared inventory item from a pack avatar regardless of the original location of the shared inventory item.

Various non-limiting examples may serve to further illustrate the disclosed virtual pack avatar system 100. In one example, a virtual amusement, park may provide pack avatars to customers (perhaps for a fee) that follow particular customers around as they enjoy the virtual amusement park. The shared inventory items for the pack avatar may be items to purchase (e.g., souvenirs, food or drink, etc.), items to borrow for free (e.g., water, park map, park rules, etc.), items to lease for a limited period (e.g., umbrella in case of rain, tarp for a picnic, etc.). In other embodiments, pack avatars may walk around freely in the park and provide these services to any customers that are near. In another example, a vendor at a state fair may have a remote-controlled pack avatar that offers goods or sale items hanging off of the pack avatar so that users can approach the pack avatar and purchase desired items for use while they are at the fair. As will be described in more detail, the pack avatar may be rendered in any fashion, and may in some embodiments be visually evocative of a pack animal such as a donkey, mule, horse, elephant, or other animal, so that users of the VU will recognize the purpose of the pack avatar.

In some embodiments, users may also employ multiple pack avatars to conveniently segregate different classes of items. For example, one pack avatar may be used to carry items related to a user's work while another may be used to carry items related to home life and recreation. Pack avatars may also carry monetary items such as money. Thus, the use of multiple pack avatars may create a convenient means for separating, finding, and accessing different kinds of items. Additionally, advertisers may also supply pack avatars that carry items related to a particular product or service, such as promotional items, demos, or coupons.

Figure 2:
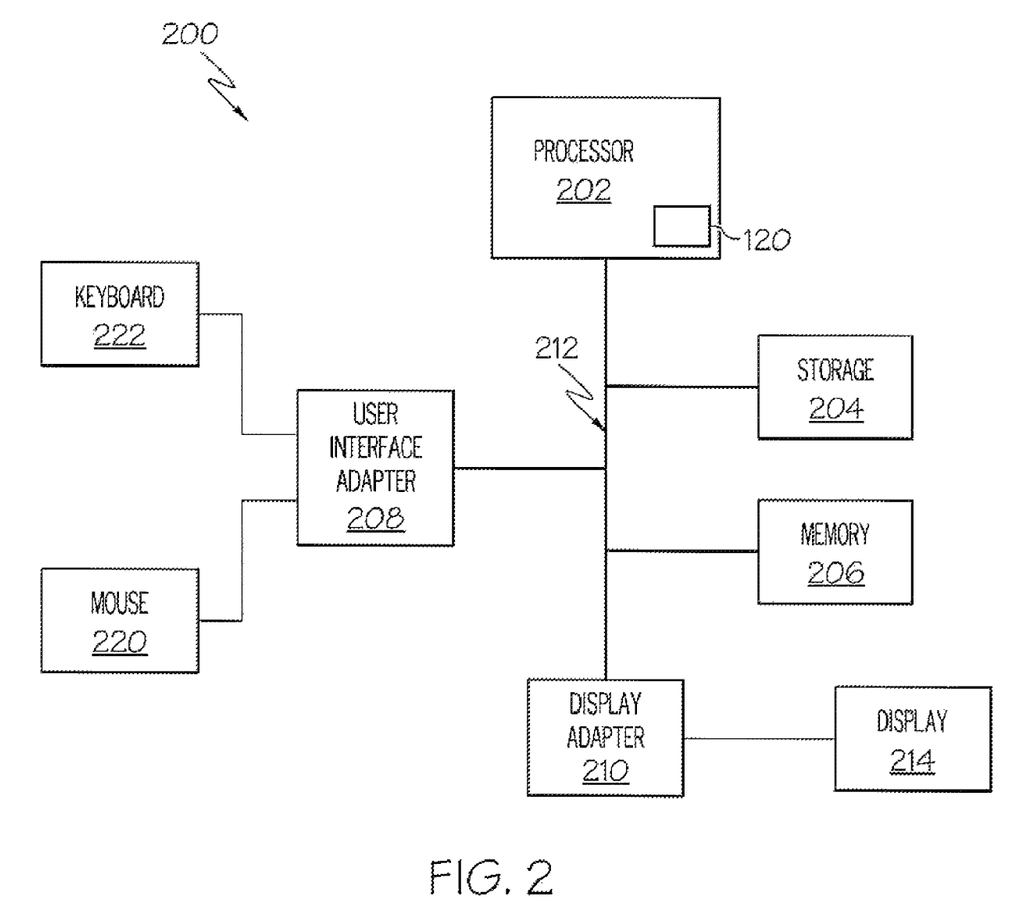
FIG. 2 depicts a block diagram of one embodiment of a computer system suitable for use as a component of the virtual pack avatar system, such as a client computer system or a data processing system to execute the pack avatar manager.

FIG. 2 depicts a block diagram of one embodiment of a computer system 200 suitable for use as a component of the virtual pack avatar system 100, such as a client computer system 106 or a data processing system to execute the pack avatar manager 120. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be nonvolatile storage such as one or more hard drives, tape drives, diskette drives, CD-ROM drive, DVD-ROM drive, or the like. The processor 202 may also be connected, to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the pack avatar manager 120, such as by accessing and passing shared inventory items to a virtual world simulator 102 in response to a user requesting to borrow an item from the pack avatar, and may temporarily or permanently store information during its calculations or results after calculations in storage 204 or memory 206. All or part of the virtual inventory manager 108, for example, may be stored in memory 206 during execution of its routines. Similarly, processor 202 may execute instructions for the VU interface 112 when computer system 200 is used for a client computer system 106.

The user interface adapter 208 may connect, the processor 202 with user interface devices such as a mouse 220 or keyboard 222. The user interface adapter 208 may also connect with other types of user input devices, such as touch pads, touch sensitive screens, electronic pens, microphones, etc. A user of a client computer system 106 attempting access to a shared inventory item carried by a pack avatar, for example, may utilize the keyboard 222 and mouse 220 to interact with their computer system to command their own avatar to approach the pack avatar and ask to borrow or purchase an item. The bus 212 may also connect the processor 202 to a display 214, such as an LCD display or CRT monitor, via the display adapter 210.

Figure 3:
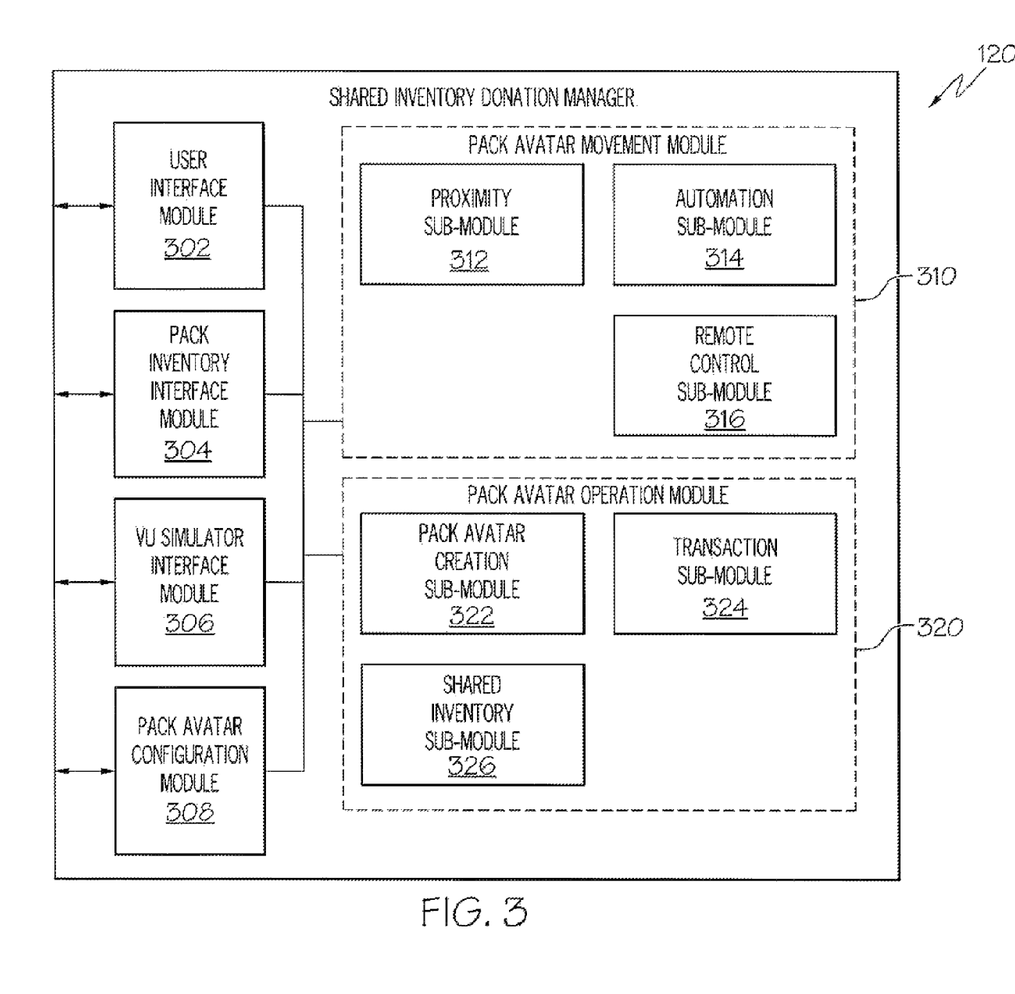
FIG. 3 depicts a conceptual illustration of software components of a pack avatar manager according to some embodiments.

FIG. 3 depicts a conceptual illustration of software components of a pack avatar manager 120 according to some embodiments. The pack avatar manager 120 may be implemented on a computer system 200 such as described in relation to FIG. 2, including on one or more servers. The pack avatar manager 120 may also alternatively be implemented as part of a virtual universe simulator 102 (i.e., executing on the same servers as the virtual universe simulator 102 as one of its components). As described previously, the pack avatar manager 120 may provide a pack avatar to provide shared inventory items to users of a VU. The pack avatar manager 120 may include components to assist it with its functions, including a user interface module 302, a pack inventory interface module 304, a pack avatar configuration module 306, a pack avatar movement module 310, and a pack avatar operation module 320. One of ordinary skill in the art will recognize that the functionality of each component of the pack avatar manager 120 may be combined or divided in any fashion and the description herein is merely intended to be illustrative of some embodiments.

The user interface module 302 may facilitate communication to and from a user, such as transmitting and receiving information associated with requesting a shared item to borrow, disclosing terms and conditions of borrowing, or handling payment for an item. For example, a user may request (and the user interface module 302 may receive) to borrow a shared inventory item and also provide payment information (e.g., credit card information), and the user interface module 302 may similarly pass information regarding terms and conditions of the borrowing to the user on their client computer system 106. The user interface module 302 may receive requests, from users of a virtual universe to borrow a shared inventory item carried by a pack avatar. The pack inventory interface module 304 may facilitate communication to and from the pack inventory database 122 or any other database, such as the universe database 110. The pack inventory module 304 may, for example, facilitate access of shared inventory items stored in a pack inventory database. Similarly, the VU simulator interface module 306 may facilitate communication to and from virtual universe simulators 102, such as by receiving notification of user sessions being established and requests for stored shared inventory items and by transmitting shared inventory items or metadata to a virtual universe simulator 102. The user interface module 302 may optionally be part of the VU simulator interface module 306 in the event that communications with users are all completed via the VU simulator 102.

The pack avatar configuration module 308 may interact with administrators or other operators of pack avatars to configure various settings of the pack avatar manager 120. Settings may be configured for particular pack avatars or groups of pack avatars (e.g., this pack avatar should default to following within 10 meters of the user) or for all avatars (e.g., all pack avatars should default to looking like a donkey). The pack avatar configuration module 308 may facilitate modification of default settings for the pack avatar manager 120 as well. One of ordinary skill in the art will recognize that any type of setting may be configured, such as pack avatar size, appearance, operation, movement, or user associations.

The pack avatar movement module 310 may move a created pack avatar within the virtual universe. The pack avatar movement module 310 may include various sub-modules to assist it in its tasks, such as a proximity sub-module 312, a remote control sub-module 314, and an automation sub-module 316. The proximity sub-module 312 may receive an indication of movement of a user associated with the pack avatar and the automation sub-module 314 may automatically determine pack avatar movement based on the received indication of movement of the associated user by, for example, keeping the pack avatar within a specified distance of the associated user. In another example, the automation sub-module 314 may control the pack avatar to stay within line of sight of the association user. The remote control sub-module 314 may receive requests for pack avatar movement and command the pack avatar accordingly to allow for an individual such as an administrator or content provider (e.g., a street vendor carrying wares) to manually control the pack avatar. The pack avatar movement module 310 may provide for flexible usage of pack avatars, and may also teleport pack avatars within the VU or perform other types of movement. Movement orders may also change, such as a pack avatar that is operating as an automated bot that switches to human control when presented with a situation requiring human invention, such as a user asking a difficult question or requesting items that are not available.

The pack avatar operation module 320 may create a pack avatar carrying one or more shared inventory items and may also render the pack avatar in the virtual universe, as well as operating the pack avatar by accessing a shared inventory item requested by a user and rendering the requested shared inventory item in the virtual universe for the user. The pack avatar operation module 320 may include sub-modules to assist it in its tasks, such as a pack avatar creation sub-module 322, a transaction sub-module 324, and a shared invention sub-module 326. The pack avatar creation sub-module 322 may create the pack avatar and may also render the pack avatar in the VU, possibly in conjunction with tire VU simulator 102. The pack avatar creation sub-module 322 may optionally associate one or more users with the pack avatar. The transaction sub-module 324 may facilitate transactions to borrow, buy, or lease shared inventory items, such as by processing user requests, handling payment and tracking, or other functions. The transaction sub-module 324 may also enforce terms and conditions on users borrowing shared inventory items from the pack avatar. The shared invention sub-module 326, as will be described in more detail in relation to FIG. 5, may manage shared inventory items carried by pack avatars. In some embodiments, the shared invention sub-module 326 may retrieve a shared inventory items from its inventory source for passing to the VU simulator 102 or client computer system 106 for rendering.

Figure 4:
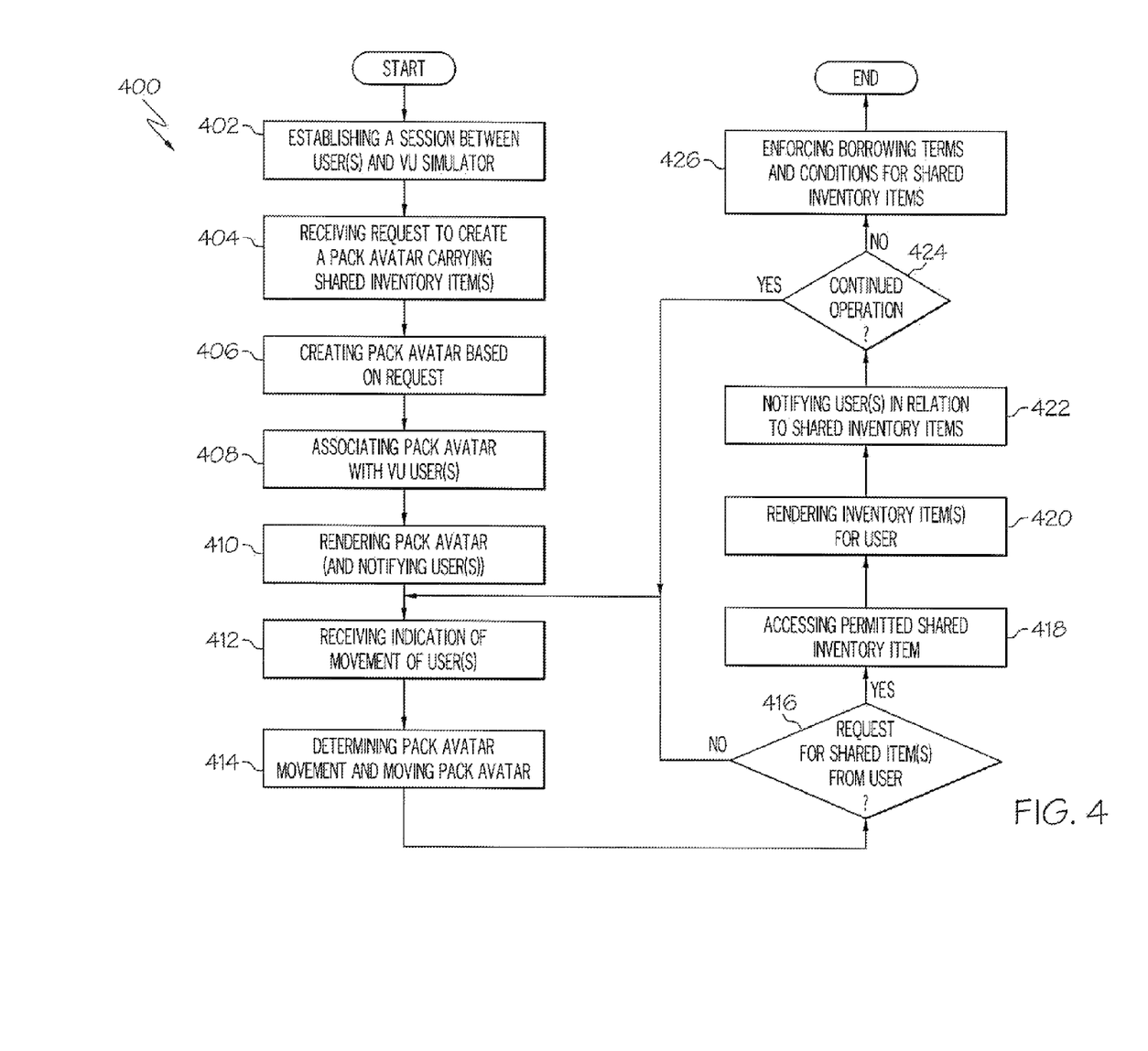
FIG. 4 depicts an example of a flow chart for providing a pack avatar carrying shared inventory items according to some embodiments.

FIG. 4 depicts an example of a flow chart 400 for providing a pack avatar carrying shared inventory items according to some embodiments. The method of flow chart 400 may be performed, in one embodiment, by components of the virtual pack avatar system 100 such as the VU simulator 102 and the pack avatar manager 120 (and its components). Flow chart 400 begins with element 402, establishing a session between one or more users and the virtual universe simulator 102. In some embodiments, establishing a user session will involve the user providing authentication information (such as a password and user id) and the virtual universe simulator 102 authenticating the user and establishing the session.

At element 404, the pack avatar manager 120 may receive a request to create a pack avatar carrying one or more shared inventory items. The request to create a pack avatar may come from any source, such as from a content provider or other owner of the pack avatar. In some embodiments, pack avatars may be created automatically upon the occurrence of particular events, such as a user establishing a session or entering a particular region of the VU. Pack avatars may also, in other embodiments, be created in response to a request from a user. The request may also optionally include preferred configurations for the pack avatar, such as appearance, style, duration of existence, or operation. Requests to create a pack avatar may also be automatic and based on a user's history of use.

The pack avatar manager 120 may at element 406 create the pack avatar based on the received request. The pack avatar may be configured in a wide variety of ways. The appearance of the pack avatar, for example, may be visible or invisible to other avatars. For visible pack avatars, it may optionally have a graphical representation (i.e., physical, appearance) of a pack animal such as a mule, donkey, horse, or elephant. In other embodiments, the pack avatar may have another representation evocative of something that carries items, such as a vendor cart, human bearer, sled, or any other item, so that users are reminded of the purpose of the pack avatar. Other aspects of the pack avatar's appearance may also be changed to provide other information, such as depicted inventory items on the avatar, using color or other aspects to indicate how many items or what kind of items are available, using graphical depictions on its skin to provide additional information, etc. Graphical indications may assist users with accessibility and reduce cognitive load on the part of users.

After creating the pack avatar, the pack avatar manager 120 may optionally associate one or more VU users with the created pack avatar at element 408. If the pack avatar will remain stationary or wander freely, association with a user is not needed. At element 410, the pack avatar may be rendered and users may optionally be notified that the pack avatar is available. The rendering of the pack avatar within the VU may be performed by the pack avatar manager 120, VU simulator 102, client computer system 106, or any combination of the components (i.e., the pack avatar manager 120 providing instructions to the VU simulator 102 or the client computer system 106, which performs the rendering).

For pack avatars that will follow the movement of one or more users, the pack avatar manager 120 may receive an indication of the movement of the one or more users at element 412, such as from the VU simulator 102. At element 414, the pack avatar manager 120 may determine pack avatar movement and move the pack avatar (or provide instructions to move it). For embodiments where the pack avatar moves in response to one or more users, the pack avatar manager 120 may determine movement based on keeping the pack avatar within a specified distance of the user, within line of sight of the user, or any other methodology. If the pack avatar is instructed to track a group of users, the pack avatar manager 120 may use algorithms to determine the best course of action in tire event that members of the group separate (e.g., stay with the majority of the group). In other embodiments, the pack avatar may remain stationary or may move independently of any users. Stationary pack avatars may be useful in high-traffic areas or in areas to which users may teleport. Independent movement of a pack avatar, as described previously, allows a pack avatar to service many users and may be useful for content providers or operators of virtual geographic locations (e.g., fairs, concerts, parks, etc.) where a pack avatar may walk around with items to share or sell. In yet another embodiment, a user may summon a pack avatar, causing it to be automatically teleported to the user's location. A user may summon an avatar by command, by remote contact (such as chat session), or other means.

At decision block 416, the pack avatar manager 120 may determine if it has received a request from a user for one or more shared inventory items. If not, the method returns to element 412 for continued monitoring and movement of the pack avatar. If a request is received, the method continues to element 418 for handling of the shared inventory request, as described below. A user may request a shared inventory item from a pack avatar in any fashion. Users may, for example, query a pack avatar to see what is in the pack avatar's inventory, similar to how the user may cheek her own inventory. Users may select items or groups of items from the inventory to be shared with the user. Pack avatars may either come equipped with items or may hold items as instructed by users (or a combination of the two). Requests for items that are carried by a pack avatar may be automatic and based on a user's history of use according to some embodiments. For example, if a user has frequently requested an item from the pack avatar in the past when in a certain region, this request may be automatically issued whenever the user is in this region. Such a history of use may be stored, for example, in data tables that contain information on items and their history of use.

Figure 5:
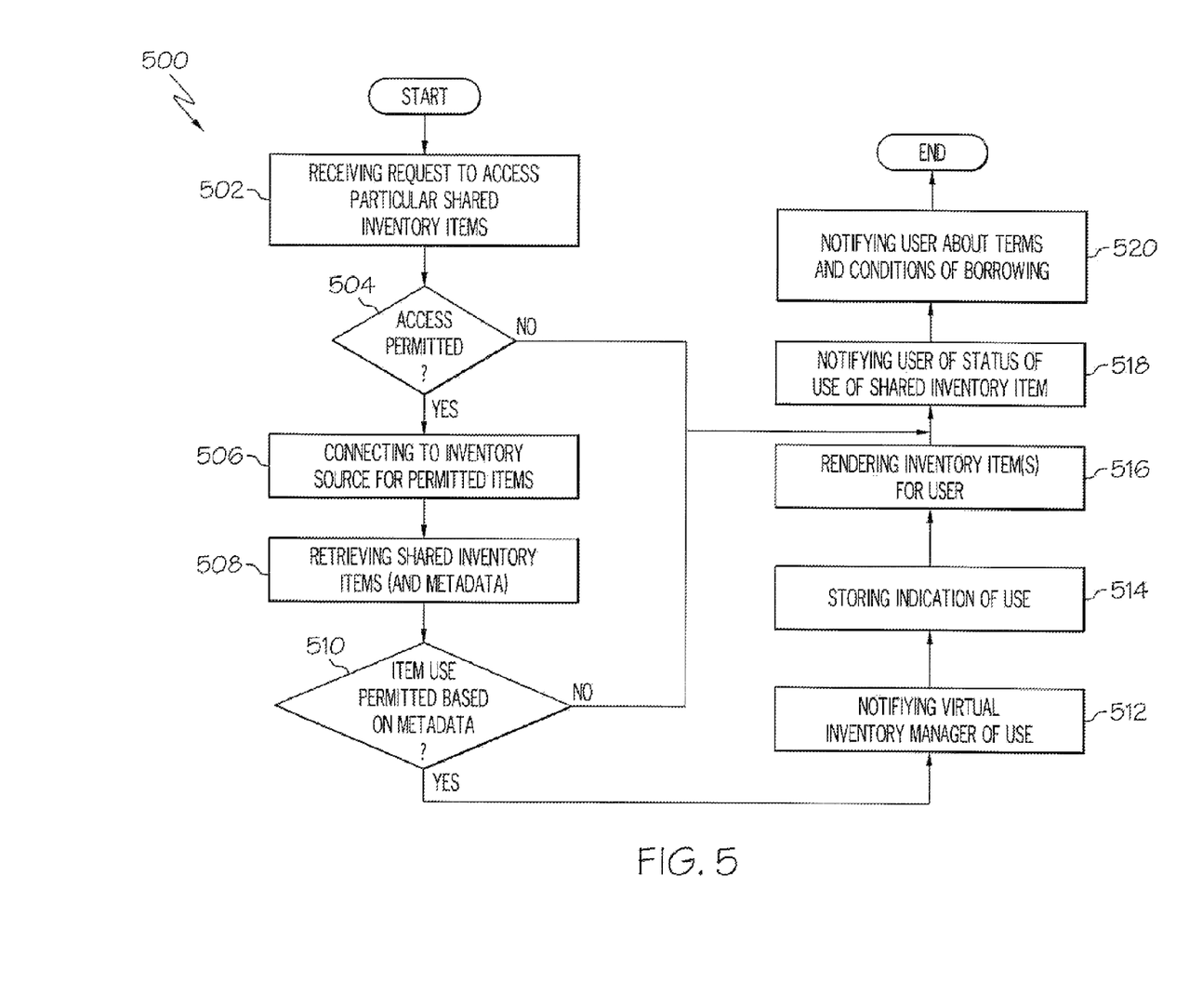
FIG. 5 depicts an example of a flow chart for managing shared inventory items according to some embodiments according to some embodiments.

Once one or more shared inventory items have been selected, the pack inventory manager 120 may, at element 418, access the permitted shared inventory items from their associated inventory sources, as described in relation to FIG. 5. The pack inventory manager 120 (in conjunction with the VU simulator 102) may then, at element 420, render the one or more requested shared inventory items in the virtual universe using the accessed shared inventory item. The pack inventory manager 120 may optionally at element 422 notify users in relation to shared inventory items, such as by informing the borrower of the terms and conditions of borrowing, by notifying the item owner that someone has borrowed the item, by notifying users that the item is no longer available for borrowing, or other notification.

If operations will continue at decision block 424, the method may return to element 412 for continued operation and movement of the pack avatar. If not, the method continues to element 426, enforcing the borrowing terms and conditions for shared inventory items, after which the method terminates. Enforcement of the borrowing terms and conditions may include terminating use of a shared inventory item by a user after the expiration of a pre-defined time period, after inappropriate use of the item, after a certain number of uses, or any other metric. A user may optionally be given a chance to extend their term of sharing by, for example, paying additional fees.

A non-limiting example of use of a pack avatar at a virtual amusement park may prove illustrative of the flexibility of the disclosed methodology. When a user enters the park, they may pay a fee for a pack avatar to be assigned to her or her group. This customer may optionally choose characteristics of the pack avatar, such as appearance, behavior (e.g., should follow customer, be available on summon, etc.), or inventory items to be included (e.g., basic or deluxe package, etc.). The pack avatar is created, associated with the customer (or her group), and may follow the customer around the park while holding items in inventory for her use or purchase as souvenirs. When the customer is interested in a particular shared inventory item she may request the pack avatar to demonstrate, wear, or preset the object. If the customer is pleased with the demonstration, she may rent the item out for the duration of her stay at the park my making a payment (or debiting an account). When the customer leaves the park, any borrowed items will be returned while any purchased souvenirs may be kept.

FIG. 5 depicts an example of a flow chart 500 for managing shared inventory items according to some embodiments. The method of flow chart 500 may be performed, in one embodiment, by components of the pack avatar manager 120 such as the pack avatar operation module 320 (and its components). The method of flow chart 500 provides a more detailed example embodiment of elements 416 through 422 of FIG. 4. Flow chart 500 begins with element 502, receiving a request from a user to access particular shared inventory items. At decision block 504, it is determined whether access to those shared inventory items is permitted for the requesting user. Access to a pack avatar and its inventory items may be controlled, in some embodiments, by a policy table, access list, password, or other means. If access is denied, the method continues to element 518 for further processing. If access is permitted, the procedure to gain access to shared inventory items begins.

At element 506, the pack avatar manager 120 may connect to the inventory sources associated with the permitted items and may at element 508 retrieve the shared inventory items (and any associated metadata). Based on the metadata, tire pack avatar manager 120 may at optional decision block 510 determine whether item use is permitted by the requesting user. A particular item may have restrictions upon its use that are contained in the metadata, such as by limiting the number of users who can share an item, limiting the time of day or other conditions of use, etc. If item use is not permitted, the method continues to element 518 for further processing. If item use is permitted (or if no test is performed), the pack avatar manager 120 at element 512 may notify a virtual inventiion manager (if one exists) of the use so that usage of shared inventory items may be tracked. The pack avatar manager 120 may also at element 514 store an indication of the use of the shared inventory item by the user.

At element 516, the shared inventory items may be rendered for the user in the VU so that they may enjoy their use during their session. The user may be notified of the status of their use of the shared inventory items at element 518, such as by notifying the user that permission was granted, denied, or partially granted. The user may also be notified at element 520 of any terms and conditions of borrowing, as described previously, after which the method terminates.

It will be apparent to those skilled in the art having the benefit of this disclosure that the present invention contemplates methods, systems, and media for providing a pack avatar for sharing inventory in a virtual universe. It is understood that the form of the invention shown and described in the detailed description and the drawings are to be taken merely as examples. It is intended that the following claims be interpreted broadly to embrace all the variations of the example embodiments disclosed.

What is claimed is:

1. A method for providing a pack avatar for shared inventory in a virtual universe, said method comprising:
   receiving, by a computer processor, a request to create the pack avatar carrying one or more shared inventory items in the virtual universe;
   said processor creating the pack avatar based on the received request;
   said processor rendering the pack avatar in the virtual universe; and
   in response to receiving a request from a virtual universe user to borrow the one or more shared inventory items carried by the pack avatar, said processor accessing the one or more requested shared inventory items and rendering the one or more requested shared inventory items in the virtual universe.

2. The method of claim 1, said method further comprising associating the pack avatar with one or more users of the virtual universe.

3. The method of claim 2, said method further comprising:
   determining pack avatar movement based on received requests for pack avatar movement; and
   moving the pack avatar within the virtual universe based on the determined pack avatar movement.

4. The method of claim 2, said method further comprising:
   receiving an indication of movement of an associated user;
   automatically determining pack avatar movement based on the received indication of movement; and
   moving the pack avatar within the virtual universe based on the determined pack avatar movement.

5. The method of claim 4, wherein determining pack avatar movement based on the received indication of movement comprises keeping the pack avatar within a specified distance of the associated user.

6. The method of claim 4, wherein determining pack avatar movement based on the received indication of movement comprises keeping the pack avatar within one of sight of the associated user.

7. The method of claim 1, said method further comprising notifying one or more virtual universe users that the pack avatar has new shared inventory.

8. The method of claim 1, said method further comprising notifying one or more virtual universe users of terms and conditions for borrowing a shared inventory item.

9. The method of claim 1, said method further comprising enforcing terms and conditions for a borrowed shared inventory item.

10. The method of claim 1, wherein accessing shared inventory items comprises connecting to an inventory source for the one or more requested shared inventory items and retrieving the shared inventory items from the inventory source.

11. The method of claim 1, wherein accessing shared inventory items comprises determining if access to the one or requested shared inventory items is permitted.

12. The method of claim 1, wherein the request to borrow one or more shared inventory items carried by the pack avatar from a virtual universe user is automatic and based on the user's history of use.

13. The method of claim 1, wherein the received request comprises a specification of: how the pack avatar is to appear, a style of the pack avatar, and a duration of existence of the pack avatar.

14. The method of claim 1, wherein each shared inventory item of the one or more shared inventory items carried by the pack avatar is a kind of inventory item and has a color indicative of said kind of inventory item.

15. The method of claim 1, wherein a data table stores a history of a user having frequently requested in the past a particular item carried by the pack avatar when the user is in a particular region, said method further comprising:
  responsive to said history stored in the data table, automatically issuing a request for borrowing the particular item whenever the user is in the particular region.

16. The method of claim 1, wherein the one or more shared inventory items carried by the pack avatar comprises a specific inventory item, said method further comprising:
  after said accessing and rendering, notifying an owner of the specific inventory item that the specific inventory item has been borrowed and notifying virtual universe users that the specific inventory item is no longer available for being borrowed.

17. The method of claim 1, wherein terms and conditions for borrowing a particular shared inventory item of the one or more shared inventory items carried by the pack avatar specify a time period upon whose expiration use of the borrowed particular shared inventory item is terminated, said method further comprising:
  response to the virtual universe user having paid a time extension fee, extending the time period to an extended time period, and
  upon expiration of the extended time period after the virtual universe user has borrowed the particular shared inventory item, terminating use of the particular shared inventory item by the virtual universe user.

18. The method of claim 1, said method further comprising:
  receiving an expression of interest by a customer in a particular shared inventory item;
  responsive to said receiving the expression of interest by the customer, said pack avatar demonstrating the particular shared inventory item to the customer;
  responsive to said demonstrating the particular shared inventory item, receiving an indication from the customer that the customer desires to rent the particular shared inventory item; and
  responsive to said receiving the indication from the customer, renting the particular shared inventory item to the customer.

19. A computer program product comprising a computer readable tangible storage device having a computer readable program stored therein, wherein the computer readable program when executed on a processor of a computer implements a method for providing a pack avatar for shared inventory in a virtual universe, said method comprising:
  receiving a request to create the pack avatar carrying one or more shared inventory items in the virtual universe;
  creating the pack avatar based on the received request;
  rendering the pack avatar in the virtual universe; and
  in response to receiving a request from a virtual universe user to borrow the one or more shared inventory items carried by the pack avatar, accessing the one or more requested shared inventory items and rendering the one or more requested shared inventory items in the virtual universe.

20. A data processing system comprising a processor, a computer readable tangible memory unit coupled to the processor, and a computer readable tangible storage device coupled to the processor, said storage device storing program code configured to be executed by the processor via the memory unit to implement a method for providing a pack avatar for shared inventory in a virtual universe, said method comprising:
  receiving a request to create the pack avatar carrying one or more shared inventory items in the virtual universe;
  creating the pack avatar based on the received request;
  rendering the pack avatar in the virtual universe; and
  in response to receiving a request from a virtual universe user to borrow the one or more shared inventory items carried by the pack avatar, accessing the one or more requested shared inventory items and rendering the one or more requested shared inventory items in the virtual universe.

* * * * *